(12) United States Patent
Lim

(10) Patent No.: US 11,292,355 B2
(45) Date of Patent: Apr. 5, 2022

(54) BATTERY CHARGING METHOD AND SYSTEM FOR ON-BOARD CHARGER

(71) Applicant: HYUNDAI AUTOEVER CORP., Seoul (KR)

(72) Inventor: Dong-Hui Lim, Yongin-si (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 182 days.

(21) Appl. No.: 16/701,274

(22) Filed: Dec. 3, 2019

(65) Prior Publication Data
US 2020/0180458 A1 Jun. 11, 2020

(30) Foreign Application Priority Data

Dec. 6, 2018 (KR) .......................... 10-2018-0156105

(51) Int. Cl.
*B60L 53/30* (2019.01)
*B60L 53/10* (2019.01)

(52) U.S. Cl.
CPC .............. *B60L 53/32* (2019.02); *B60L 53/11* (2019.02); *B60L 2210/30* (2013.01); *B60L 2240/547* (2013.01)

(58) Field of Classification Search
CPC ...... B60L 53/32; B60L 53/11; B60L 2210/30; B60L 2240/547; B60L 2210/10; B60L 53/14; B60L 53/22; B60L 53/20; B60L 53/53; B60L 2240/527; B60L 2240/529; Y02T 10/92; Y02T 10/72; Y02T 90/12;
(Continued)

(56) References Cited

U.S. PATENT DOCUMENTS

2012/0091970 A1* 4/2012 Cho .......................... H02J 7/02
320/160
2016/0105056 A1 4/2016 Namurdri et al.

FOREIGN PATENT DOCUMENTS

KR 10-2005-0008455 A 1/2005
KR 10-1655200 B1 9/2016
(Continued)

OTHER PUBLICATIONS

Korean Notice of Allowance dated Jan. 19, 2021 from the corresponding Korean Patent Application No. 10-2018-0156105, 5 pp.
(Continued)

*Primary Examiner* — Paul Dinh
(74) *Attorney, Agent, or Firm* — Lempia Summerfield Katz LLC

(57) ABSTRACT

A battery charging method for an on-board charger (OBC) includes: applying, by a controller, an output voltage of a first converter to a second converter by controlling the output voltage based on a result of a comparison between a battery load voltage and a battery rated voltage; controlling, by the controller, the second converter to perform a frequency modulation on the output voltage using a low-speed frequency modulation method or a high-speed frequency modulation method based on a result of the control of the output voltage; and generating, by the controller, a frequency harmonic of a system frequency in a battery current based on a modulation method used to perform the frequency modulation. An output voltage of the first converter is controlled based on a load voltage state of a battery and applied to the second converter.

12 Claims, 6 Drawing Sheets

(58) Field of Classification Search
CPC ..... Y02T 90/14; Y02T 10/70; Y02T 10/7072; H02J 7/06; H02M 3/33569; B60Y 2200/91; B60Y 2200/92
USPC .......................................................... 320/104
See application file for complete search history.

(56) References Cited

FOREIGN PATENT DOCUMENTS

| KR | 10-2018-0027794 A | 3/2018 |
| KR | 10-2018-0102290 A | 9/2018 |

OTHER PUBLICATIONS

Korean Office Action dated Jun. 11, 2020 from the corresponding Korean Application No. 10-2018-0156105, 5 pp.

* cited by examiner

<Change in switch voltage and current
according to actual switch on/off operation>

<Average value of switching losses
according to actual switch on/off operation>

<Before harmonic reduction control is applied>

<After harmonic reduction control is applied>

BATTERY CHARGING METHOD AND SYSTEM FOR ON-BOARD CHARGER

CROSS-REFERENCE TO RELATED APPLICATION

This application claims priority to and the benefit of Korean Patent Application No. 10-2018-0156105, filed on Dec. 6, 2018, the entire contents of which are incorporated herein by reference in its entirety.

FIELD

The present disclosure relates to a battery charging method and system for an on-board charger (OBC).

BACKGROUND

The statements in this section merely provide background information related to the present disclosure and may not constitute prior art.

In the vehicle market, recently, the demand for eco-friendly vehicles is rapidly increasing. The eco-friendly vehicle includes an electric vehicle and a plugin hybrid electric vehicle. A charging apparatus for charging a high voltage battery is necessary for the electric vehicle and the plugin hybrid electric vehicle.

The charging apparatus includes an on-board charger (OBC) and a high-speed battery charger. The OBC of the charging apparatuses has been standardized and compatible regardless of the type of vehicle. The OBC adopts a method of charging a battery by supplying commercial AC power (e.g., 220 V) to a vehicle.

The OBC is an apparatus for being supplied with electric energy (AC power) through electric vehicle supply equipment (EVSE) and charging a high voltage battery through an in-cable control box (ICCB). In the case of the electric vehicle and the plugin hybrid electric vehicle, the time taken to charge a battery through the OBC is about 4 to 6 hours depending on the capacity of the battery.

The high-speed battery charger of the charging apparatuses is an apparatus for charging a battery by variably supplying DC of 100 V to 450 V to an electric vehicle or a plugin hybrid electric vehicle, and has a less charging time than the OBC.

SUMMARY

Various forms of the present disclosure are directed to a battery charging method for an on-board charger (OBC) and a battery charging system for an OBC, by which an output voltage of a first converter is applied to a second converter by controlling the output voltage based on a load voltage state of a battery and the second converter outputs an output voltage suitable for the battery so that the battery is charged normally.

Objects of the present disclosure are not limited to the above-described objects, and other objects and advantages of the present disclosure not described above may be understood from the following description and evidently understood based on forms of the present disclosure. It may also be seen that the objects and advantages of the present disclosure may be realized by means written in the claims and a combination thereof.

In one form of the present disclosure, a battery charging method for an on-board charger (OBC) includes: applying, by a battery controller, an output voltage of a first converter to a second converter by controlling the output voltage based on a result of a comparison between a battery load voltage and a battery rated voltage; controlling, by the battery controller, the second converter to perform a frequency modulation on the output voltage using a low-speed frequency modulation method or a high-speed frequency modulation method based on a result of the control of the output voltage; and generating, by the battery controller, a frequency harmonic of a system frequency in a battery current based on a modulation method, among the low-speed frequency modulation method or the high-speed frequency modulation method, used to perform the frequency modulation.

In another form, the applying of the output voltage of the first converter to the second converter by controlling the output voltage based on the result of the comparison between the battery load voltage and the battery rated voltage includes: changing the output voltage into a first voltage and applying the changed output voltage to the second converter when the battery load voltage is less than the battery rated voltage; and changing the output voltage into a second voltage and applying the changed output voltage to the second converter when the battery load voltage is equal to or greater than the battery rated voltage.

In other form, the changing of the output voltage into the first voltage includes: determining the first voltage based on a specific ratio of the battery rated voltage and rated efficiency of the second converter; and changing the output voltage into the first voltage.

In one aspect of the present disclosure, the changing of the output voltage into the second voltage includes: determining the second voltage using a correction value determined based on a sensed value of the output voltage of the first converter, an input/output voltage and current, and a battery charging system; and changing the output voltage into the second voltage.

In another aspect, the controlling of the second converter to perform the frequency modulation on the output voltage using the low-speed frequency modulation method or the high-speed frequency modulation method based on the result of the control of the output voltage includes: when the output voltage is changed into the first voltage, controlling the second converter to perform the frequency modulation using the low-speed frequency modulation method so that an output voltage of the second converter is controlled; and when the output voltage is changed into the second voltage, controlling the second converter to perform the frequency modulation using the high-speed frequency modulation method so that an output voltage of the second converter is controlled.

In other form, the generating of the frequency harmonic of the system frequency in the battery current based on the modulation method used to perform the frequency modulation includes: generating the frequency harmonic of the system frequency in the battery current when the frequency modulation is performed on the output voltage using the low-speed frequency modulation method.

In another form, a battery charging system for an on-board charger (OBC) includes: a first converter configured to convert a voltage of input power, a second converter configured to receive an output voltage of the first converter as an input voltage and convert the input voltage into a voltage for battery charging by performing a switching on/off operation using a low-speed frequency modulation method or a high-speed frequency modulation method, and a battery controller configured to apply the output voltage of the first converter to the second converter by controlling the output voltage based on a result of a comparison between a battery load voltage and a battery rated voltage, control the second converter to perform a frequency modulation on the output voltage using the low-speed frequency modulation method or the high-speed frequency modulation method based on a result of the control of the output voltage, and generate a frequency harmonic of a system frequency in a battery current based on a modulation method, among the low-speed frequency modulation method or the high-speed frequency modulation method, used to perform the frequency modulation.

In one form, the battery controller is configured to change the output voltage into a first voltage and apply the changed output voltage to the second converter when the battery load voltage is less than the battery rated voltage and to change the output voltage into a second voltage and apply the changed output voltage to the second converter when the battery load voltage is equal to or greater than the battery rated voltage.

In another form, the battery controller is configured to determine the first voltage based on a specific ratio of the battery rated voltage and rated efficiency of the second converter and to change the output voltage into the first voltage and apply the changed output voltage to the second converter.

In some implementations, the battery controller is configured to determine the second voltage using a correction value determined based on a sensed value of the output voltage of the first converter, an input/output voltage and current, and a battery charging system and to change the output voltage into the second voltage and apply the changed output voltage to the second converter.

In some implementations, the battery controller is configured to control the second converter to perform the frequency modulation using the low-speed frequency modulation method so that an output voltage of the second converter is controlled when the output voltage is changed into the first voltage, and the controller may control the second converter to perform the frequency modulation using the high-speed frequency modulation method so that an output voltage of the second converter is controlled when the output voltage is changed into the second voltage.

In other form, the battery controller is configured to generate the frequency harmonic of the system frequency in the battery current when the frequency modulation is performed on the output voltage using the low-speed frequency modulation method.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
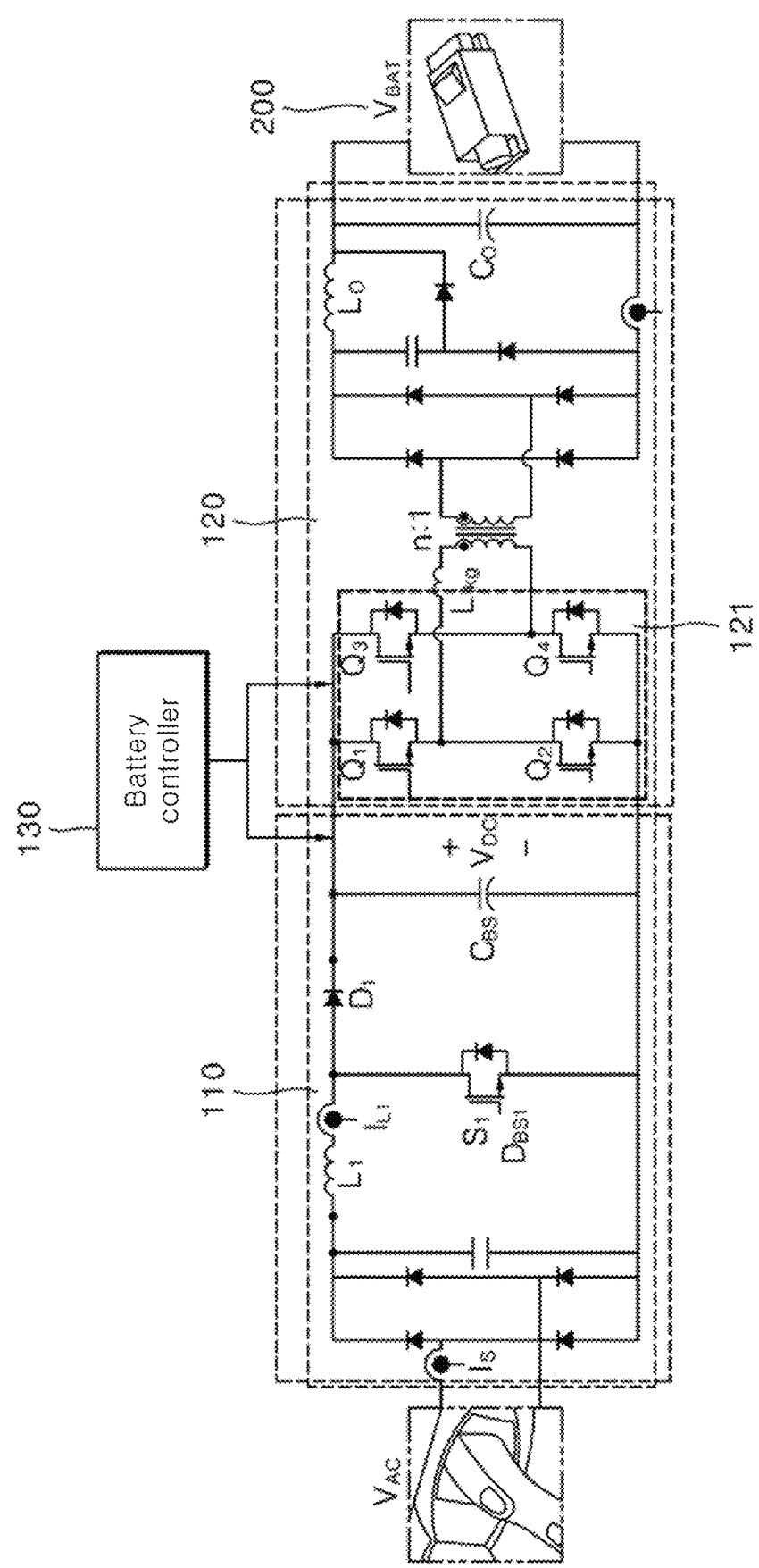
FIG. 1 is a configuration diagram for describing a battery charging system for an OBC.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a battery charging method and system for an on-board charger (OBC) will be described below with reference to the accompanying drawings through various examples.

The above-described objects, characteristics, and merits are described in detail with reference to the accompanying drawings, and thus a person having ordinary skill in the art to which the present disclosure pertains may readily practice the technical spirit of the present disclosure. Furthermore, in describing the present disclosure, a detailed description of a known art related to the present disclosure will be omitted if it is deemed to make the gist of the present disclosure unnecessarily vague. Hereinafter, forms according to the present disclosure are described in detail with reference to the accompanying drawings. In the drawings, the same reference numerals are used to denote the same or similar elements.

FIG. 1 is a configuration diagram for describing a battery charging system for an OBC according to one form of the present disclosure.

Referring to FIG. 1, the battery charging system for an OBC includes a first converter 110 for converting input power into DC power and improving a power factor, a second converter 120 for converting DC power, received from the first converter 110, into AC power and storing the AC power as energy for a battery 200 of an eco-friendly vehicle, and a battery controller 130.

The first converter 110 may function to reduce a power loss occurring in a process of converting AC power into DC power. In one form of the present disclosure, the first converter 110 functions to generally equally control the size of an input voltage.

The first converter 110 improves power transmission efficiency by removing a phase difference between the voltage and current of AC power using an internal matching circuit. Furthermore, if input power is a pulse wave, the first converter 110 makes generally equal power through pulse with modulation (PWM) control.

The second converter 120 receives an output voltage $V_{DC}$ of the first converter 110 as an input voltage, and may charge the battery 200 of an eco-friendly vehicle based on a voltage desired for the battery by controlling the input voltage.

The second converter 120 includes a full bridge circuit 121 for performing a frequency modulation on an input voltage using a low-speed frequency modulation method or a high-speed frequency modulation method under the control of the battery controller 130.

The full bridge circuit 121 may include four switches (e.g., FETs) that alternately switch and output DC. Specifically, the full bridge circuit 121 may have upper switches and lower switches coupled to each other to face a middle point in a cascode structure.

The second converter 120 may provide the output voltage $V_{DC}$ of the first converter 110 to a transformer through the full bridge circuit 121, and may store electric energy in a capacitor Co at the output stage of the second converter 120 through the transformer and a rectifier.

The full bridge circuit 121 of the second converter 120 receives the output voltage $V_{DC}$ of the first converter 110 as an input voltage, and may charge the battery 200 of an eco-friendly vehicle based on a voltage desired for the battery by performing a frequency modulation on the input voltage using a low-speed frequency modulation method or a high-speed frequency modulation method under the control of the battery controller 130.

In one form, if a signal corresponds to a frequency modulation using the low-speed frequency modulation method under the control of the battery controller 130, the full bridge circuit 121 of the second converter 120 performs a frequency modulation on an input voltage using the low-speed frequency modulation method.

In another form, if a signal corresponds to a frequency modulation using the high-speed frequency modulation method under the control of the battery controller 130, the full bridge circuit 121 of the second converter 120 performs a frequency modulation on an input voltage using the high-speed frequency modulation method.

The battery controller 130 applies the output voltage $V_{DC}$ of the first converter 110 to the second converter 120 by controlling the output voltage $V_{DC}$ based on a result of a comparison between a battery load voltage and a battery rated voltage.

In general, the lower the output voltage $V_{DC}$ of the first converter 110, the smaller the average value of switching losses occurring in a switching control process when the second converter 120 performs a frequency modulation. Accordingly, execution efficiency of the second converter 120 is increased.

In contrast, the higher the output voltage $V_{DC}$ of the first converter 110, the greater the average value of switching losses occurring in a switching control process when the second converter 120 performs a frequency modulation. Accordingly, execution efficiency of the second converter 120 is reduced.

For such a reason, the lower the output voltage $V_{DC}$ of the first converter 110, the better the execution efficiency of the second converter 120. If the output voltage $V_{DC}$ of the first converter 110 is too low, however, the battery 200 is not charged because the second converter 120 does not operate normally.

Accordingly, the battery controller 130 of the present disclosure applies the output voltage $V_{DC}$ of the first converter 110 to the second converter 120 by controlling the output voltage based on a battery load voltage state depending on the states of the second converter 120 and the battery 200, so that the second converter 120 operates normally and thus the battery 200 is charged normally.

To this end, the battery controller 130 of the present disclosure compares a battery load voltage with a battery rated voltage, changes the output voltage $V_{DC}$ of the first converter 110 into a first voltage or a second voltage based on a result of the comparison, and applies the changed output voltage to the second converter 120.

In one form, the battery controller 130 compares a battery load voltage with a battery rated voltage, changes the output voltage $V_{DC}$ of the first converter 110 into a first voltage if the battery load voltage is less than the battery rated voltage, and applies the changed output voltage to the second converter 120.

In this case, the battery controller 130 calculates the first voltage using Equation 1, changes the output voltage $V_{DC}$ of the first converter 110 into the first voltage, and applies the changed output voltage to the second converter 120.

$$\text{First voltage} = V\text{bat\_A/rated efficiency}, \quad [\text{Equation 1}]$$

where Vbat_A: battery rated voltage, Rated efficiency: a specific ratio of rated efficiency of the second converter 120.

The battery controller 130 determines a first voltage based on a specific ratio (e.g., 90%) of a battery rated voltage and rated efficiency of the second converter 120 as in Equation 1, changes the output voltage $V_{DC}$ of the first converter 110 into the first voltage, and applies the changed output voltage to the second converter 120 so that the second converter 120 operates normally and thus the battery 200 is charged normally.

In another form, if a battery load voltage is a battery rated voltage or more, the battery controller 130 changes the output voltage $V_{DC}$ of the first converter 110 into a second voltage, and applies the changed output voltage to the second converter 120.

$$\text{Second voltage} = V\text{bat/efficiency*correction value}, \quad [\text{Equation 2}]$$

where, Vbat: a sensed value of an output voltage of the first converter,

Efficiency: input/output voltage/current,

Correction value: a value tuned according to a battery charging system.

If a battery load voltage is a battery rated voltage or more, the battery controller 130 changes the output voltage $V_{DC}$ of the first converter 110 into a second voltage calculated using Equation 2, and applies the changed output voltage to the second converter 120 so that the second converter 120 operates normally and thus the battery 200 is charged normally.

As described above, the battery controller 130 changes the output voltage $V_{DC}$ of the first converter 110 into a first voltage or a second voltage, and applies the changed output voltage to the second converter 120. The second converter 120 performs frequency control by performing a switching on/off operation using a low-speed frequency modulation method or a high-speed frequency modulation method using the output voltage of the first converter 110 as an input voltage.

In one form, if the output voltage $V_{DC}$ of the first converter 110 is changed into a first voltage, the battery controller 130 controls the second converter 120 to perform frequency control by performing a switching on/off operation using the low-speed frequency modulation method.

As in the above form, if the battery controller 130 controls the second converter 120 to perform frequency control by performing a switching on/off operation using the low-speed frequency modulation method, there is a problem in that a current ripple of the battery 200 is reduced. Accordingly, the battery controller 130 solves the problem in that the current ripple of the battery 200 is reduced, by generating the frequency harmonic of a system frequency in the current of the battery 200.

In another form, if the output voltage $V_{DC}$ of the first converter 110 is changed into a second voltage, the battery controller 130 controls the second converter 120 to perform frequency control by performing a switching on/off operation using the high-speed frequency modulation method.

As described above, the battery controller 130 controls the second converter 120 to perform a switching on/off operation using the low-speed frequency modulation method or the high-speed frequency modulation method based on a result of control of the output voltage $V_{DC}$ of the first converter 110 so that the output voltage of the second converter 120 is controlled to be suitable for the battery 200.

Figure 2:
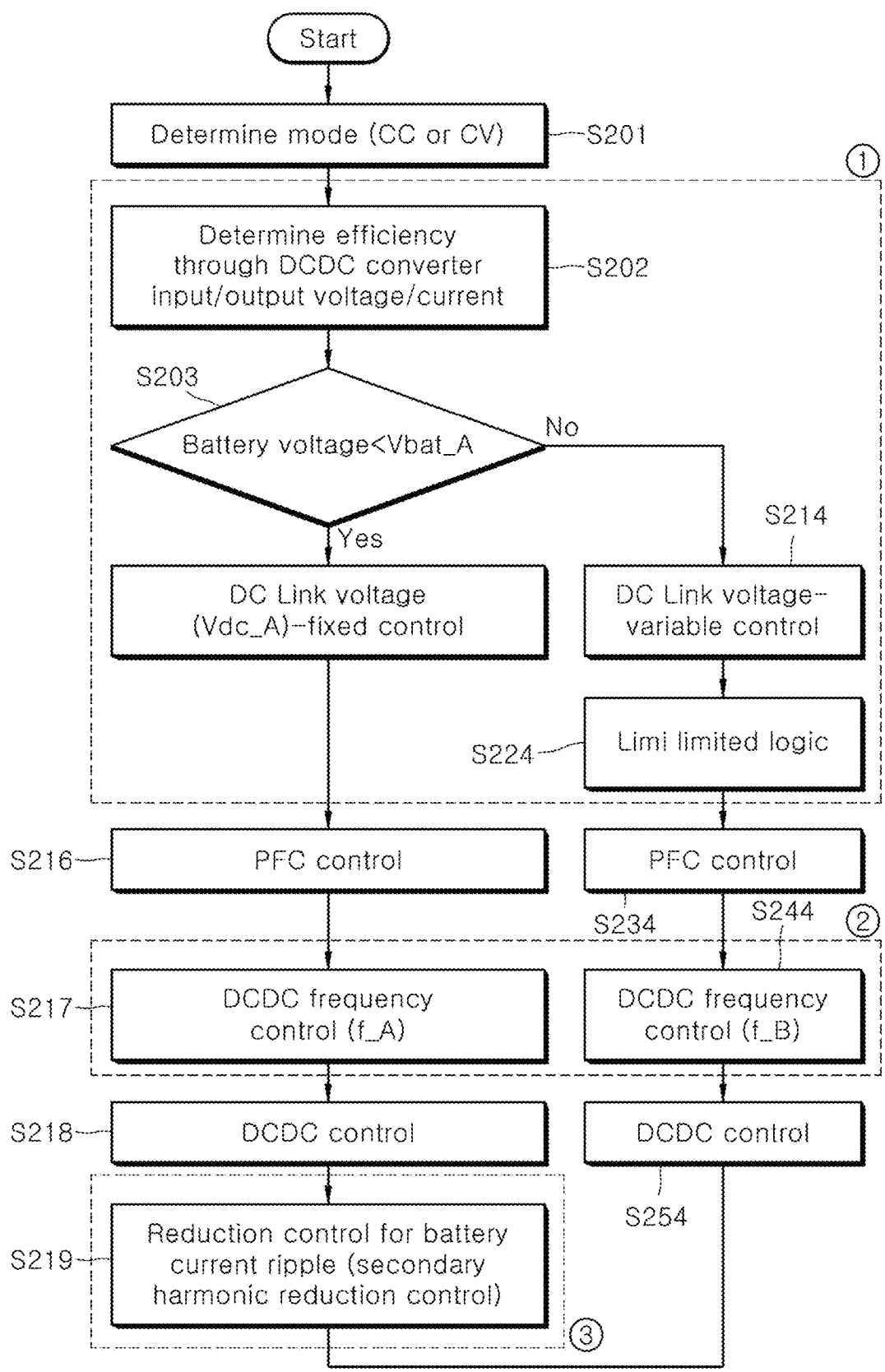
FIG. 2 is a flowchart for describing a battery charging method for an OBC.

FIG. 2 is a flowchart for describing one form of a battery charging method for an OBC according to the present disclosure.

Referring to FIGS. 1 and 2, the battery controller 130 determines a battery charging mode (step S201), and determines rated efficiency of the second converter 120 (step S202) if the battery charging mode is a standard charging mode.

The reason why rated efficiency of the second converter 120 is determined as described above is that if a battery load voltage is less than a battery rated voltage at step S203, an output voltage of the first converter 110 is changed into a first voltage, but the first voltage is determined based on the battery rated voltage and the rated efficiency of the second converter 120.

In general, the lower the output voltage $V_{DC}$ of the first converter 110, the smaller the average value of switching losses occurring in a switching control process when the second converter 120 performs a frequency modulation. Accordingly, execution efficiency of the second converter 120 is increased.

Furthermore, the higher the output voltage of the first converter 110, the greater the average value of switching losses occurring in a switching control process when the second converter 120 performs a frequency modulation. Accordingly, execution efficiency of the second converter 120 is reduced.

For such a reason, the lower the output voltage $V_{DC}$ of the first converter 110, the better the execution efficiency of the second converter 120. If the output voltage $V_{DC}$ of the first converter 110 is too low, however, the battery 200 is not charged because the second converter 120 does not operate normally.

Accordingly, the battery controller 130 of the present disclosure applies an output voltage of the first converter 110 to the second converter 120 by controlling the output voltage based on a battery load voltage state depending on the states of the second converter 120 and the battery 200, so that the second converter 120 operates normally and thus the battery 200 is charged normally.

To this end, the battery controller 130 of the present disclosure compares a battery load voltage and a battery rated voltage (step S203), changes the output voltage $V_{DC}$ of the first converter 110 into a first voltage or a second voltage by performing step S214 or step S215 based on a result of the comparison, and applies the changed output voltage to the second converter 120.

In one form, if the battery load voltage is the battery rated voltage or more, the battery controller 130 changes the output voltage into a second voltage and applies the changed output voltage to the second converter 120 (step S214).

In the above form, if the battery load voltage is the battery rated voltage or more, the battery controller 130 changes the output voltage into the second voltage calculated using Equation 2 and applies the changed output voltage to the second converter 120 so that the second converter 120 operates normally and thus the battery 200 is charged normally.

In another form, if the battery load voltage is less than the battery rated voltage (step S203), the battery controller 130 changes the output voltage of the first converter 110 into a first voltage and applies the changed output voltage to the second converter 120 (step S215).

In this case, the battery controller 130 calculates the first voltage using Equation 1, changes the output voltage of the first converter 110 into the first voltage, and applies the changed output voltage to the second converter 120.

As described above, after the battery controller 130 changes the output voltage of the first converter 110 into the first voltage or the second voltage and applies the changed output voltage to the second converter 120, the battery controller 130 controls the second converter 120 to perform frequency control by performing a switching on/off operation using a low-speed frequency modulation method or a high-speed frequency modulation method using the output voltage of the first converter 110 as an input voltage (step S216).

In one form, if the output voltage $V_{DC}$ of the first converter 110 is changed into the first voltage, the battery controller 130 controls the second converter 120 to perform frequency control by performing a switching on/off operation using the low-speed frequency modulation method (step S217).

As in the above form, if the battery controller 130 controls the second converter 120 to perform frequency control by performing a switching on/off operation using the low-speed frequency modulation method, there is a problem in that a current ripple of the battery 200 is reduced.

Accordingly, the battery controller 130 solves the problem in that the current ripple of the battery 200 is reduced, by generating the frequency harmonic of a system frequency in the current of the battery 200.

In another form, if the output voltage of the first converter 110 is changed into the second voltage, the battery controller 130 controls the second converter 120 to perform frequency control by performing a switching on/off operation using the high-speed frequency modulation method.

As described above, the battery controller 130 controls the second converter 120 to perform a switching on/off operation using the low-speed frequency modulation method or the high-speed frequency modulation method based on a result of control of the output voltage of the first converter 110 so that the output voltage of the second converter 120 is controlled to be suitable for the battery 200.

Figure 3A:
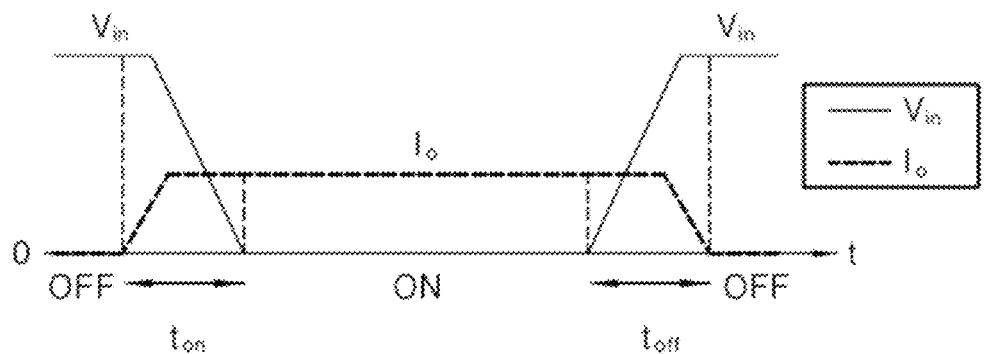
FIGS. 3A and 3B are diagrams respectively describing a switching loss.
Figure 3B:
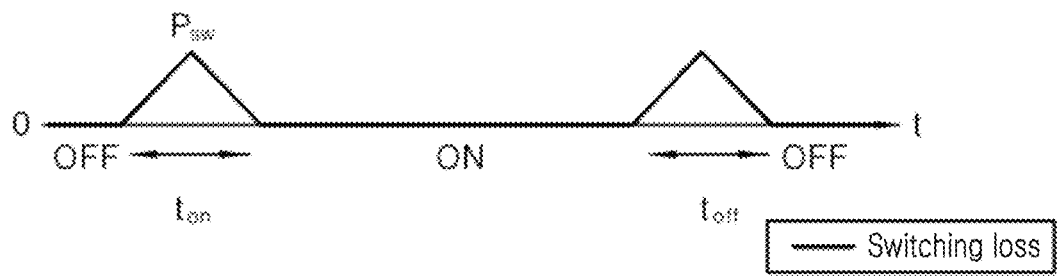

FIGS. 3A and 3B are diagrams for describing a switching loss according to one form of the present disclosure.

Referring to FIGS. 1 and 3, the first converter 110 may function to reduce a power loss occurring in a process of converting AC power into DC power. The second converter 120 receives an output voltage $V_{DC}$ of the first converter 110 as an input voltage, and may charge the battery 200 of an eco-friendly vehicle based on a voltage desired for the battery by controlling the input voltage.

The second converter 120 receives the output voltage $V_{DC}$ of the first converter 110 as the input voltage, and performs a switching on/off operation in a process of performing a frequency modulation on the input voltage.

In a process of ideally performing a switching on/off operation, the time taken to change an on operation into an off operation, and vice versa is 0. However, in a process of actually performing a switching on/off operation, some time is taken to change an on operation into an off operation, and vice versa.

An average value of switching losses occurring in a switching control process when a frequency modulation is performed as described above is calculated using Equation 3.

$$P_{SW} = \frac{1}{2} \times \frac{V_{in} \times I_o}{2} \times (t_{on} + t_{off}) \times f_s \qquad \text{[Equation 3]}$$

where, $P_{SW}$: an average value of switching losses,
$V_{in}$: an output voltage $V_{DC}$ of first converter 110,
$I_O$: Switch conduction current,
$t_{on}+t_{off}$: time taken to change a switching on/off state, and
$f_s$: Switching frequency.

FIG. 3A illustrates a change in the switch voltage and current according to an on operation and off operation in a process of actually performing a switching on/off operation. FIG. 3B illustrates an average value of switching losses occurring in a process of actually performing a switching on/off operation.

An average value of switching losses calculated using Equation 3 is changed depending on a change in the output voltage $V_{DC}$ of the first converter 110. For example, the calculated average value of switching losses will be changed into the average value of switching losses of FIG. 3B depending on a change in the output voltage $V_{DC}$ of the first converter 110.

That is, the lower the output voltage $V_{DC}$ of the first converter 110, the smaller the average value of switching losses occurring in a switching control process when the second converter 120 performs a frequency modulation. The higher the output voltage $V_{DC}$ of the first converter 110, the greater the average value of switching losses occurring in a switching control process when the second converter 120 performs a frequency modulation.

As a result, the lower the output voltage $V_{DC}$ of the first converter 110, the smaller the average value of switching losses occurring in a switching control process when the second converter 120 performs a frequency modulation. Accordingly, execution efficiency of the second converter 120 is increased.

Furthermore, the higher the output voltage $V_{DC}$ of the first converter 110, the greater the average value of switching losses occurring in a switching control process when the second converter 120 performs a frequency modulation. Accordingly, execution efficiency of the second converter 120 is reduced.

For such a reason, the lower the output voltage $V_{DC}$ of the first converter 110, the better the execution efficiency of the second converter 120. If the output voltage $V_{DC}$ of the first converter 110 is too low, however, the battery 200 is not charged because the second converter 120 does not operate normally.

Accordingly, the battery controller 130 of the present disclosure applies the output voltage $V_{DC}$ of the first converter 110 to the second converter 120 by controlling the output voltage based on a battery load voltage state depending on the states of the second converter 120 and the battery 200, so that the second converter 120 operates normally and thus the battery 200 is charged normally.

FIG. 4 is a graph illustrating a comparison between battery currents before a battery current ripple is compensated for and after the battery current ripple is compensated for according to one form of the present disclosure.

Referring to FIG. 4, the battery controller 130 compares a battery load voltage with a battery rated voltage, changes an output voltage $V_{DC}$ of the first converter 110 into a first voltage or a second voltage based on a result of the comparison, and applies the changed output voltage to the second converter 120.

After the battery controller 130 changes the output voltage $V_{DC}$ of the first converter 110 into the first voltage or the second voltage and applies the changed output voltage to the second converter 120, the battery controller 130 controls the second converter 120 to perform frequency control by performing a switching on/off operation using a low-speed frequency modulation method or a high-speed frequency modulation method using the output voltage of the first converter 110 as an input voltage.

In one form, if the output voltage $V_{DC}$ of the first converter 110 is changed into the first voltage, the battery controller 130 controls the second converter 120 to perform frequency control by performing a switching on/off operation using the low-speed frequency modulation method.

As in the above form, if the battery controller 130 controls the second converter 120 to perform frequency control by performing a switching on/off operation using the low-speed frequency modulation method, there is a problem in that a current ripple of the battery 200 is reduced. Accordingly, the battery controller 130 solves the problem in that the current ripple of the battery 200 is reduced, by generating the frequency harmonic of a system frequency in the current of the battery 200.

Figure 4A:
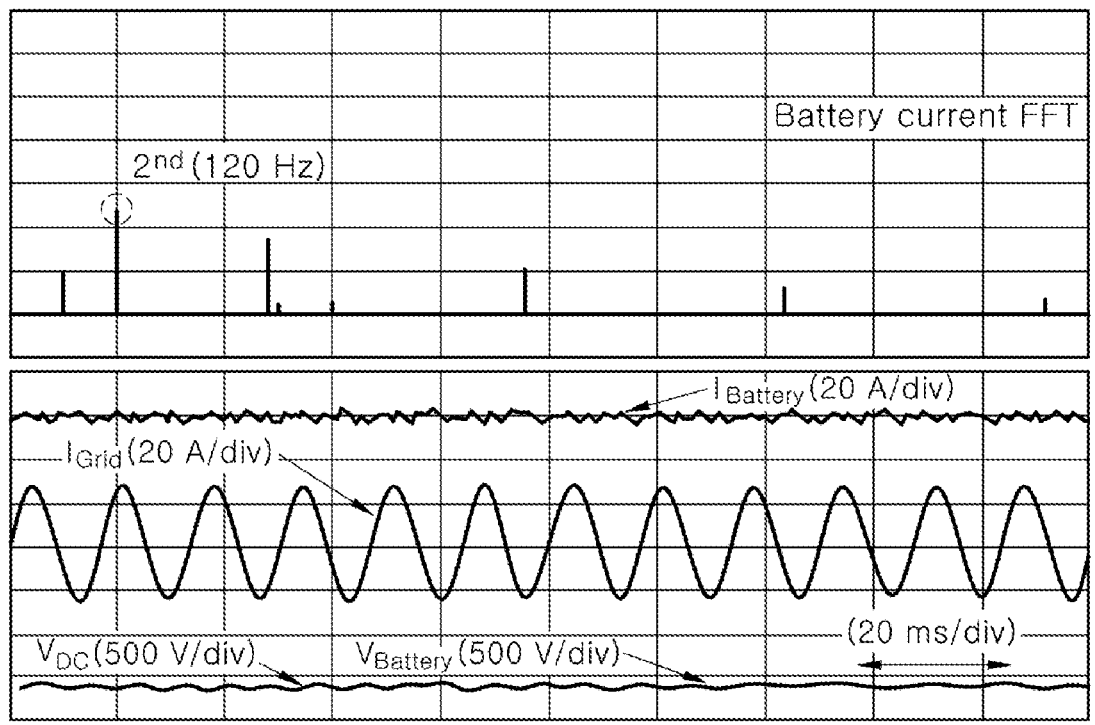
FIG. 4A is a graph illustrating battery currents before a battery current ripple is compensated.
Figure 4B:
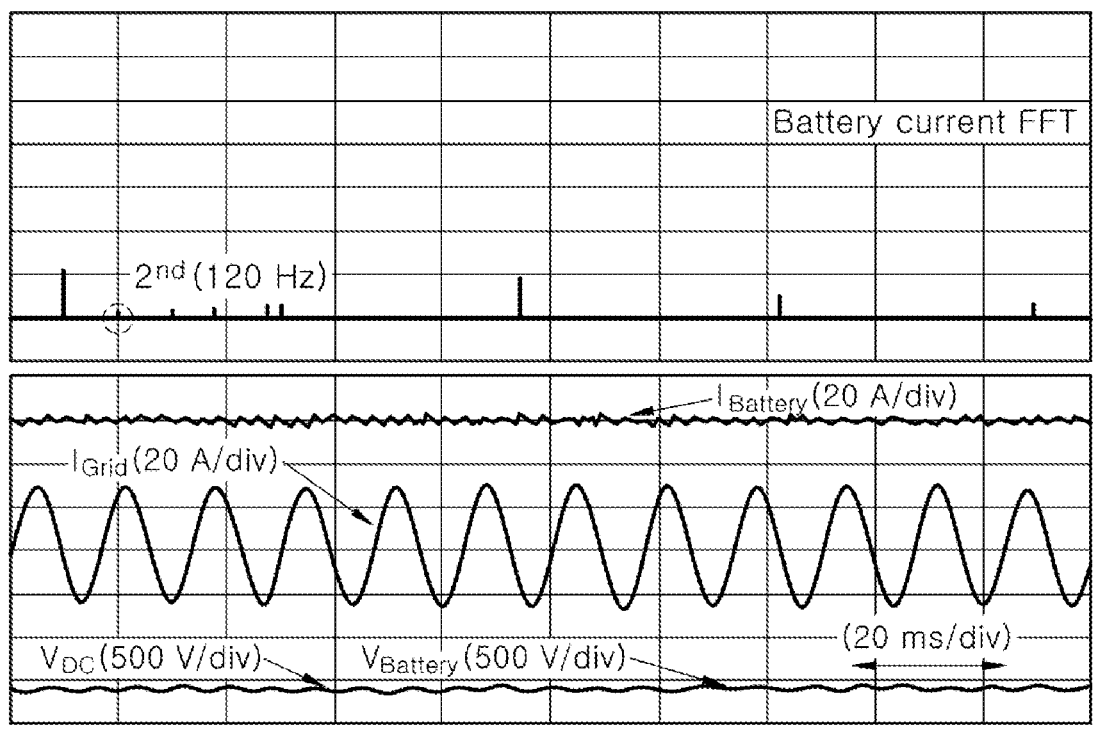
FIG. 4B is a graph illustrating battery currents after a battery current ripple is compensated.

FIG. 4A is a graph illustrating a battery current state in which the frequency harmonic of a system frequency was not generated in a current of the battery 200. FIG. 4B is a graph illustrating a battery current state after the current ripple of the battery 200 was reduced by generating the frequency harmonic of a system frequency in the current of the battery 200.

In FIG. 4A, a lot of noise is present in the battery current because the frequency harmonic of a system frequency is not generated in the current. In contrast, in FIG. 4B, less noise is present in the battery current because the current ripple of the battery 200 is reduced by generating the frequency harmonic of a system frequency in the current of the battery 200.

Figure 5:
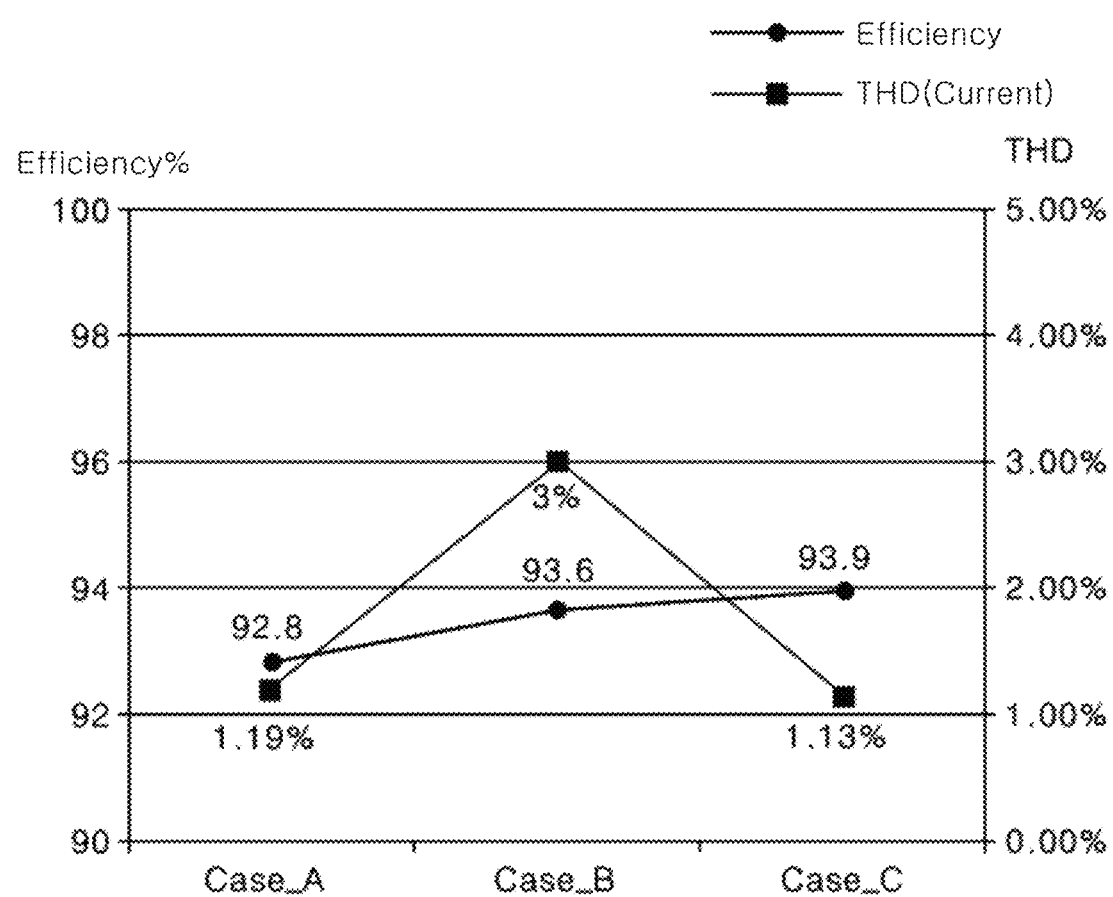
FIG. 5 is a graph illustrating a comparison between the execution results of the battery charging system for an OBC.

FIG. 5 is a graph illustrating a comparison between the execution results of the battery charging system for an OBC according to one form of the present disclosure and another system.

Referring to FIG. 5, three types of cases were experimented in order to compare a battery charging effect according to the battery charging method for an OBC with a battery charging effect according to another battery charging method.

Case A is a case where a frequency modulation was performed after the output voltage $V_{DC}$ of the first converter 110 was controlled, but the frequency harmonic of a system frequency was not generated in a current of the battery 200 so that the current ripple of the battery occurring in a process of performing a switching on/off operation was reduced.

Case B is a case where a frequency modulation was performed after the output voltage $V_{DC}$ of the first converter 110 was controlled.

Case C is a case where after the output voltage $V_{DC}$ of the first converter 110 was controlled as in the battery charging method for an OBC according to the present disclosure, a frequency modulation was performed and the frequency harmonic of a system frequency was generated in a current of the battery 200 so that the current ripple of the battery occurring in a process of performing a switching on/off operation was not reduced.

From a comparison among Case A to Case C, it can be seen that Case C where the battery charging method for an OBC according to the present disclosure was performed has the highest efficiency as in the graph of FIG. 5.

As described above, according to the present disclosure, an output voltage of the first converter is controlled based on a load voltage state of a battery and applied to the second converter. Accordingly, there is an advantage in that the battery is charged normally because the second converter outputs an output voltage suitable for the battery.

Although exemplary forms of the disclosure have been disclosed for illustrative purposes, those skilled in the art will appreciate that various modifications, additions and substitutions are possible, without departing from the scope and spirit of the present disclosure.

What is claimed is:

1. A battery charging method for an on-board charger (OBC), the battery charging method comprising:
    applying, by a battery controller, an output voltage of a first converter to a second converter by changing the output voltage of the first converter based on a result of a comparison between a battery load voltage and a battery rated voltage;
    controlling, by the battery controller, the second converter to perform a frequency modulation on the output voltage of the first converter using a low-speed frequency modulation method or a high-speed frequency modulation method based on the changed output voltage of the first converter; and
    generating, by the battery controller, a frequency harmonic of a system frequency in a battery current based on a modulation method, among the low-speed frequency modulation method or the high-speed frequency modulation method, used to perform the frequency modulation.

2. The battery charging method of claim 1, wherein applying the output voltage of the first converter to the second converter comprises:
    changing the output voltage of the first converter into a first voltage and applying the changed output voltage of the first converter to the second converter when the battery load voltage is less than the battery rated voltage; and
    changing the output voltage of the first converter into a second voltage and applying the changed output voltage of the first converter to the second converter when the battery load voltage is equal to or greater than the battery rated voltage.

3. The battery charging method of claim 2, wherein changing the output voltage of the first converter into the first voltage comprises:
    determining the first voltage of the first converter based on a specific ratio of the battery rated voltage and rated efficiency of the second converter; and
    changing the output voltage of the first converter into the first voltage.

4. The battery charging method of claim 2, wherein changing the output voltage of the first converter into the second voltage comprises:
    determining the second voltage using a correction value determined based on a sensed value of the output voltage of the first converter, an input/output voltage and current, and a battery charging system; and
    changing the output voltage of the first converter into the second voltage.

5. The battery charging method of claim 2, wherein controlling the second converter to perform the frequency modulation on the output voltage comprises:
    when the output voltage of the first converter is changed into the first voltage, controlling the second converter to perform the frequency modulation using the low-speed frequency modulation method so that an output voltage of the second converter is controlled; and
    when the output voltage of the first converter is changed into the second voltage, controlling the second converter to perform the frequency modulation using the high-speed frequency modulation method so that an output voltage of the second converter is controlled.

6. The battery charging method of claim 5, wherein generating the frequency harmonic of the system frequency in the battery current comprises:
    generating the frequency harmonic of the system frequency in the battery current when the frequency modulation is performed on the output voltage of the first converter using the low-speed frequency modulation method.

7. A battery charging system for an on-board charger (OBC), the battery charging system comprising:
    a first converter configured to convert a voltage of input power;
    a second converter configured to:
        receive an output voltage of the first converter as an input voltage, and
        convert the input voltage into a voltage for battery charging by performing a switching on/off operation using a low-speed frequency modulation method or a high-speed frequency modulation method; and
    a battery controller configured to:
        apply the output voltage of the first converter to the second converter by changing the output voltage of the first converter based on a result of a comparison between a battery load voltage and a battery rated voltage,
        control the second converter to perform a frequency modulation on the output voltage of the first converter using the low-speed frequency modulation method or the high-speed frequency modulation method based on the changed output voltage of the first converter, and
        generate a frequency harmonic of a system frequency in a battery current based on a modulation method, among the low-speed frequency modulation method or the high-speed frequency modulation method, used to perform the frequency modulation.

8. The battery charging system of claim 7, wherein the battery controller is configured to:
    change the output voltage of the first converter into a first voltage and apply the changed output voltage of the first converter to the second converter when the battery load voltage is less than the battery rated voltage; and
    change the output voltage of the first converter into a second voltage and apply the changed output voltage of the first converter to the second converter when the battery load voltage is equal to or greater than the battery rated voltage.

9. The battery charging system of claim 8, wherein the battery controller is configured to:
    determine the first voltage of the first converter based on a specific ratio of the battery rated voltage and rated efficiency of the second converter; and
    change the output voltage of the first converter into the first voltage and apply the changed output voltage of the first converter to the second converter.

10. The battery charging system of claim 8, wherein the battery controller is configured to:
    determine the second voltage using a correction value determined based on a sensed value of the output voltage of the first converter, an input/output voltage and current, and a battery charging system; and change the output voltage of the first converter into the second voltage and apply the changed output voltage of the first converter to the second converter.

11. The battery charging system of claim 8, wherein the battery controller is configured to:

control the second converter to perform the frequency modulation using the low-speed frequency modulation method so that an output voltage of the second converter is controlled, if the output voltage of the first converter is changed into the first voltage; and control the second converter to perform the frequency modulation using the high-speed frequency modulation method so that an output voltage of the second converter is controlled, if the output voltage of the first converter is changed into the second voltage.

12. The battery charging system of claim 11, wherein the battery controller is configured to generate the frequency harmonic of the system frequency in the battery current when the frequency modulation is performed on the output voltage of the first converter using the low-speed frequency modulation method.

\* \* \* \* \*